US012424943B2

(12) United States Patent
Cho et al.

(10) Patent No.: US 12,424,943 B2
(45) Date of Patent: Sep. 23, 2025

(54) POWER APPARATUS

(71) Applicant: IRON DEVICE CORPORATION, Seoul (KR)

(72) Inventors: Hyun Min Cho, Seoul (KR); Ki Tae Park, Seoul (KR); Jin Sung Kim, Seoul (KR)

(73) Assignee: IRON DEVICE CORPORATION, Seoul (KR)

( * ) Notice: Subject to any disclaimer, the term of this patent is extended or adjusted under 35 U.S.C. 154(b) by 182 days.

(21) Appl. No.: 18/359,845

(22) Filed: Jul. 26, 2023

(65) Prior Publication Data

US 2024/0097552 A1 Mar. 21, 2024

(30) Foreign Application Priority Data

Sep. 19, 2022 (KR) .................. 10-2022-0117934

(51) Int. Cl.
*H02M 3/335* (2006.01)
*H02M 1/00* (2007.01)

(52) U.S. Cl.
CPC ....... *H02M 3/33561* (2013.01); *H02M 1/008* (2021.05); *H02M 3/33571* (2021.05); *H02M 3/33576* (2013.01); *H02M 1/009* (2021.05)

(58) Field of Classification Search
CPC .. H02M 1/008; H02M 1/009; H02M 3/33561; H02M 3/33571; H02M 3/33576
See application file for complete search history.

(56) References Cited

U.S. PATENT DOCUMENTS

2014/0240052 A1* 8/2014 Mao .................. H03F 1/56
330/302

FOREIGN PATENT DOCUMENTS

JP 2005245181 A 9/2005
KR 10-2022-0081572 A 6/2022

OTHER PUBLICATIONS

Office Action from the Korean Intellectual Property Office (KIPO) dated Jan. 4, 2024 in Korean Patent Application No. 10-2022-0117934.
Office Action from the Korean Intellectual Property Office (KIPO) dated Sep. 23, 2024 in Korean Patent Application No. 10-2022-0117934.

* cited by examiner

*Primary Examiner* — Jue Zhang
(74) *Attorney, Agent, or Firm* — AJU IP Global PLLC

(57) ABSTRACT

A power source apparatus, according to an aspect of the present disclosure, includes: a circuit on a primary side constituted so that a first voltage with an input voltage stepped down is formed on the primary side of a transformer; and a circuit on a secondary side including first to N sub-circuits (N is a natural number of 2 or more), each sub-circuit operating to generate a power source voltage of a driver configured to drive a power element through a converter operating based on a second voltage formed on the secondary side of the transformer after the first voltage is transformed by the transformer, in which the power source voltage generated by the sub-circuit is determined dependently on an output voltage of the converter.

9 Claims, 6 Drawing Sheets

POWER APPARATUS

CROSS REFERENCE TO RELATED APPLICATION

The present application claims priority to Korean Patent Application No. 10-2022-0117934, filed on Sep. 19, 2022, the entire contents of which is incorporated herein for all purposes by this reference.

BACKGROUND OF THE INVENTION

Field of the Invention

The present disclosure relates to a power source apparatus, and more particularly, to a power source apparatus for supplying an isolated multiple floating ground power source.

Description of the Related Art

A general large power conversion system is constituted of a power device such as a MOSFET, a gate driver for driving the power device, a power source apparatus for supplying a power source to drive the gate driver, and a controller for controlling the operation of the gate driver. As an example of the large power conversion system, FIG. 1 illustrates an inverter INV constituted of six power elements (MOSFET) $Q_{AH}$, $Q_{BH}$, $Q_{CH}$, $Q_{AL}$, $Q_{BL}$, and $Q_{CL}$, gate drivers $GD_1$ to $GD_6$ for driving power elements $Q_{AH}$ to $Q_{CL}$ of the inverter INV, a power source apparatus (gate drive supply) for supplying drive power source of the gate drivers $GD_1$ to $GD_6$, and a controller for controlling the operation of the gate drivers $GD_1$ to $GD_6$.

The gate drivers $GD_1$ to $GD_6$ supply sufficient current and appropriate voltage to the power elements $Q_{AH}$ to $Q_{CL}$ so that the gate drivers may receive a control signal from the controller and turn on/off the power elements $Q_{AH}$ to $Q_{CL}$ within the desired time. In addition, the gate drivers $GD_1$ to $GD_6$ are responsible for an isolation function of a control area and a high-voltage area with a $V_{BUS}$ connected for safety, and are therefore isolated from the drive power sources ($(V_{1P}, V_{1C},$ and $V_{1N})$ to $(V_{4P}, V_{4C},$ and $V_{4N})$ in FIG. 1) and power sources for signal processing ($V_{CC}$ and SGND in FIG. 1) of the gate drivers $GD_1$ to $GD_6$.

In a power topology in which the $V_{BUS}$ is high-voltage and constituted as a type of bridge, as illustrated in FIG. 1, since a drive voltage is required with respect to connection nodes A, B, and C with lower switches $Q_{AL}, Q_{BL},$ and $Q_{CL}$, for driving upper switches $Q_{AH}, Q_{BH},$ and $Q_{CH}$, the drive power sources ($V_{1P}, V_{1C},$ and $V_{1N}$) to ($V_{3P}, V_{3C},$ and $V_{3N}$) of the gate drivers $GD_1$, $GD_2$, and $GD_3$ that drive the upper switches $Q_{AH}, Q_{BH},$ and $Q_{CH}$ are constituted as multiple and as a type of floating ground. In case of the operation of the lower switches $Q_{AL}, Q_{BL},$ and $Q_{CL}$, since the node to which the drive voltage is referenced is the same as PGDN, the lower switches $Q_{AL}, Q_{BL},$ and $Q_{CL}$, may be operated with the same drive power sources $V_{4P}, V_{4C},$ and $V_{4N}$, or with individual drive power sources as necessary.

Meanwhile, some types of power elements require a smaller voltage than common grounds ($V_{1C}$ to $V_{4C}$ in FIG. 1) to which some types of power elements are referenced when turned off, in which case the drive power sources of the gate drivers $GD_1$ to $GD_6$ require not only positive power sources $V_{1P}$ to $V_{4P}$ but also negative power sources $V_{1N}$ to $V_{4N}$. In general, the positive power source value is almost determined once the power element is determined, while the negative power source value needs to be finely selected and adjusted according to many variables, such as the electrical energy, efficiency, and switching frequency of a power conversion device. However, in case of the conventional power topology, there is no mechanism to finely adjust the drive power source of the gate drivers $GD_1$ to $GD_6$, especially the negative power source.

SUMMARY OF THE INVENTION

An object according to an aspect of the present disclosure is directed to providing a power source apparatus that is capable of supplying a drive power source for floating ground to a gate driver for driving a power element that is key in a large power conversion system in an efficient, lightweight, simple, and low-cost manner, and that is capable of readily adjusting the drive power source of the gate driver.

A power source apparatus, according to an aspect of the present disclosure, includes: a circuit on a primary side constituted so that a first voltage with an input voltage stepped down is formed on the primary side of a transformer; and a circuit on a secondary side including first to N sub-circuits (N is a natural number of 2 or more), each sub-circuit operating to generate a power source voltage of a driver configured to drive a power element through a converter operating based on a second voltage formed on the secondary side of the transformer after the first voltage is transformed by the transformer, in which the power source voltage generated by the sub-circuit is determined dependently on an output voltage of the converter.

According to the present disclosure, the circuit on the primary side may include first and second switches, and in which the input voltage may be stepped down to form the first voltage based on a complementary operation of the first and second switches.

According to the present disclosure, the first and second switches and an inductor on the primary side of the transformer may constitute a converter configured to step down the input voltage to form the first voltage.

According to the present disclosure, the power source voltage may be constituted as a bipolar voltage having a positive voltage and a negative voltage, and in which each bipolar voltage generated by each of the sub-circuits may be constituted to be insulated from each other.

According to the present disclosure, the sub-circuit may include a first node, a second node, and a converter output node, in which the second voltage may correspond to a potential difference between the first node and the second node, in which a potential difference between the converter output node and the second node may correspond to the output voltage of the converter, and in which two nodes of the first node, the second node, and the converter output node may function as nodes at which the bipolar voltage is formed, and the other node may function as a common ground for the bipolar voltage.

According to the present disclosure, functions of the first node, the second node, and the converter output node may be determined by a voltage converting operation of the circuit on the primary side and the circuit on the secondary side.

According to the present disclosure, in case that the circuit on the primary side operates as a buck converter and the converter of the circuit on the secondary side is implemented as a buck converter, the first node and the second node may each function as a node at which the positive voltage and the negative voltage of the bipolar voltage are formed, and the converter output node may function as a common ground.

According to the present disclosure, in case that the circuit on the primary side operates as a buck converter and the converter of the circuit on the secondary side is implemented as a buck-boost converter, the first node and the converter output node may each function as a node at which the positive voltage and the negative voltage of the bipolar voltage are formed, and the second node may function as a common ground.

According to the present disclosure, in case that the circuit on the primary side operates as a buck-boost converter and the converter of the circuit on the secondary side is implemented as a buck converter, the first node and the second node may each function as a node at which the positive voltage and the negative voltage of the bipolar voltage are formed, and the converter output node may function as a common ground.

According to the present disclosure, in case that the circuit on the primary side operates as a buck-boost converter and the converter of the circuit on the secondary side is implemented as a buck-boost converter, the first node and the converter output node may each function as a node at which the positive voltage and the negative voltage of the bipolar voltage are formed, and the second node may function as a common ground.

According to an aspect of the present disclosure, the present invention employs a circuit structure that generates the power source voltage (drive power source for floating ground) of the driver (gate driver) that drives the power element through the converter that operates based on the voltage of the secondary side formed on the secondary side of the transformer, thereby enabling the power source voltage of the driver to be supplied with efficiency, a light weight, simplicity, and a low cost. In addition, by employing the power topology in which the power source voltage of the driver is determined dependently on the output voltage of the converter, it is possible to easily adjust the power source voltage of the driver, especially the negative voltage, through a manner in which only the output voltage of the converter of the circuit on the secondary side is adjusted without changing the turns ratio of the transformer.

DETAILED DESCRIPTION OF THE INVENTION

Figure 1:
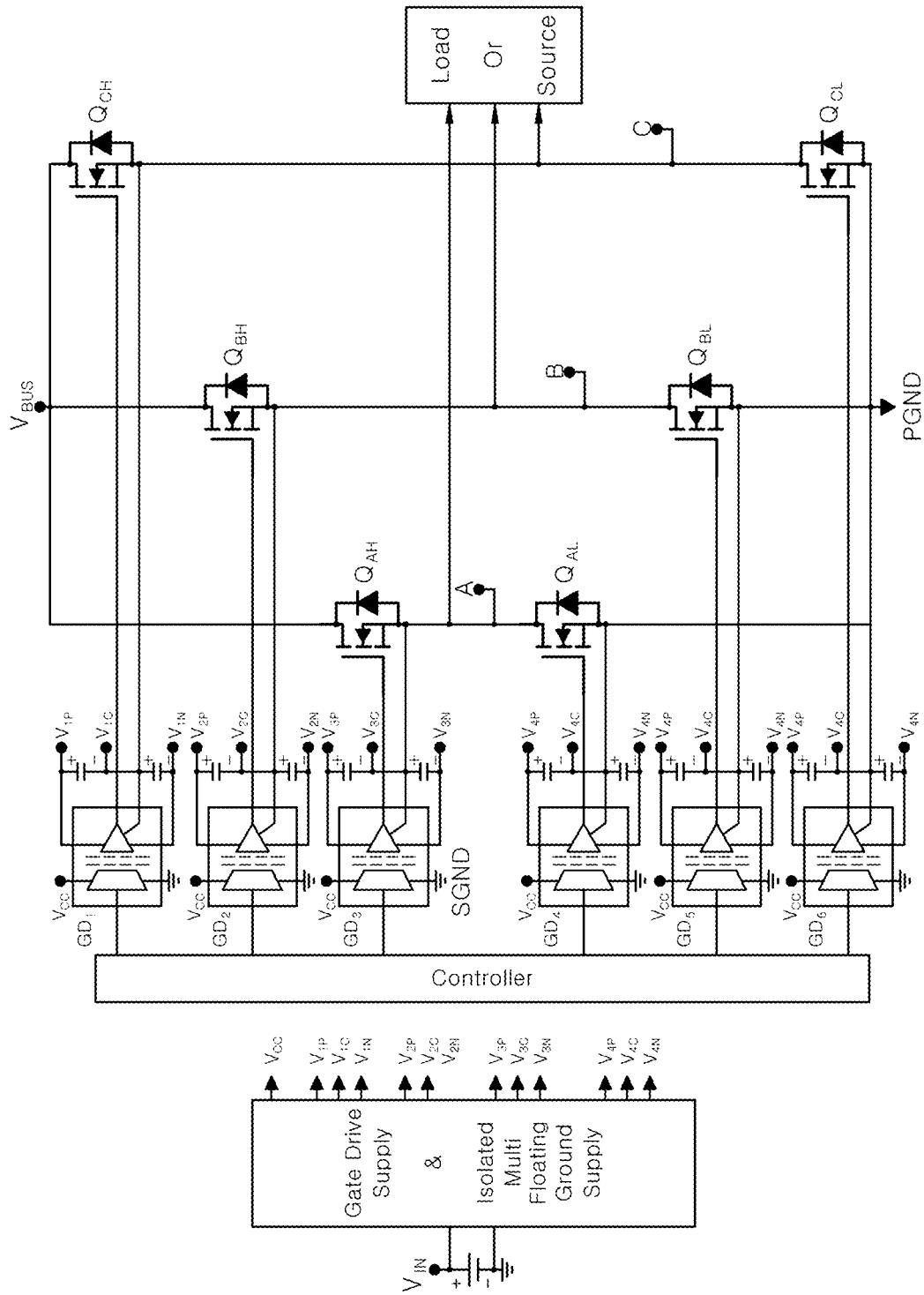
FIG. 1 is a circuit diagram illustrating an example of a general large power conversion system.

Hereinafter, a power source apparatus according to the present disclosure will be described with reference to the accompanying drawings. Here, thicknesses of lines, sizes of constituent elements, or the like illustrated in the drawings, may be exaggerated for clarity and convenience of description. In addition, the terms used below are defined in consideration of the functions thereof in the present disclosure and may vary depending on the intention of an administrator or an operator or a usual practice. Therefore, the definition of the terms should be made based on the entire contents of the present specification.

Figure 2:
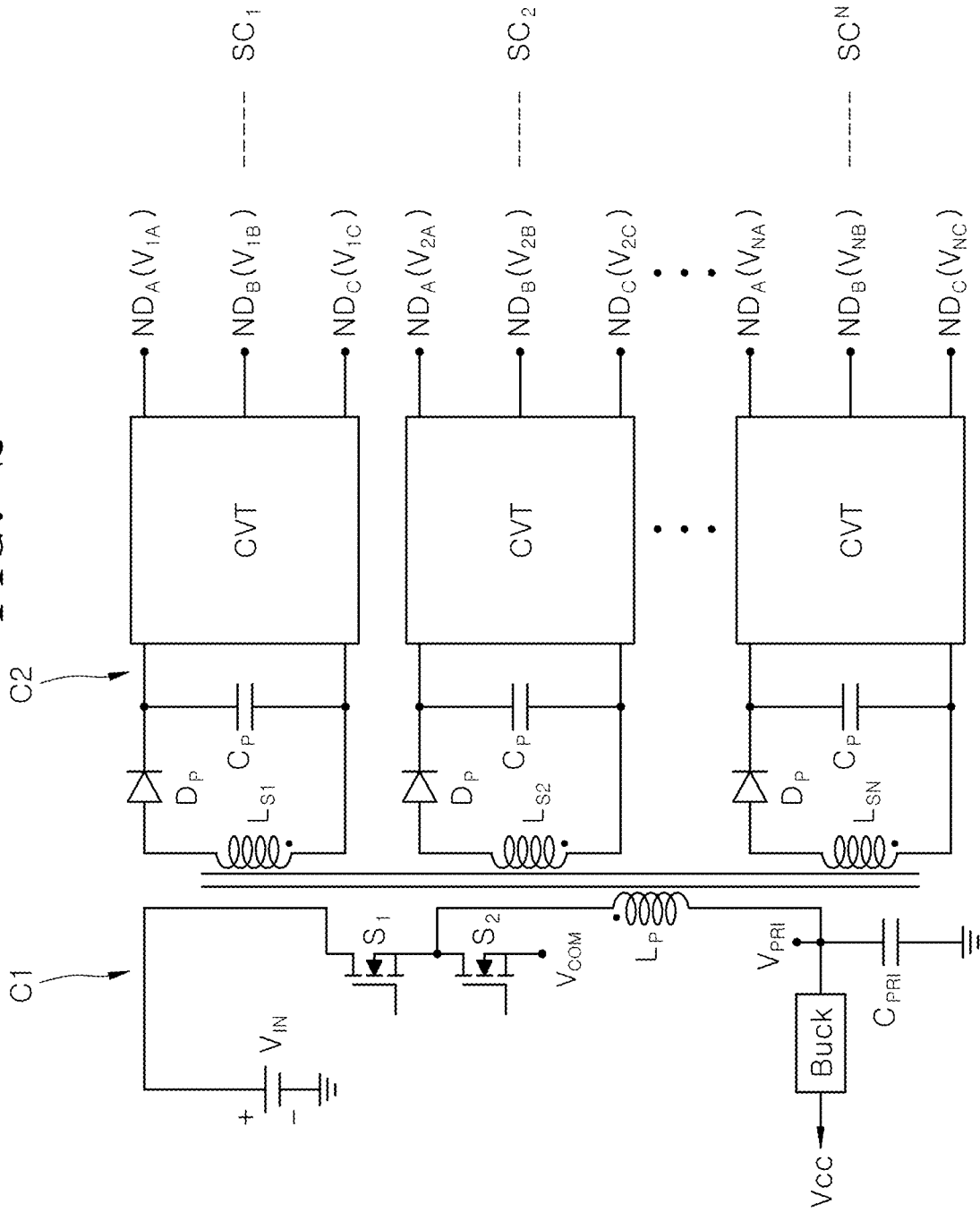
FIG. 2 is a circuit diagram of a power source apparatus according to an embodiment of the present disclosure.

FIG. 2 is a circuit diagram of a power source apparatus according to an embodiment of the present disclosure. As illustrated in FIG. 2, the power source apparatus of the present embodiment includes a circuit C1 on a primary side and a circuit C2 on a secondary side, which are divided on the basis of a transformer, and the transformer may correspond to a multiple transformer constituted of one inductor $L_P$ on the primary side and N inductors $L_{S1}$ to $L_{SN}$ on a secondary side (N is a natural number of 2 or more, which is equal to the number of sub-circuits described below).

The circuit C1 on the primary side is constituted of first and second switches S1 and S2 (e.g., MOSFET), the inductor $L_P$ on the primary side of the transformer, and a capacitor $C_{PRI}$. A drain terminal of the first switch S1 is connected to a DC input power source, and a source terminal of the first switch S1 and a drain terminal of the second switch S2 are connected to each other. The inductor $L_P$ on the primary side is connected between a connection node between the first and second switches S1 and S2 and one terminal of the capacitor $C_{PRI}$, and the other terminal of the capacitor $C_{PRI}$ is grounded.

Turn-on and turn-off of the first and second switches S1 and S2 are complementarily controlled by a controller (e.g., power management integrated circuit (PMIC), not illustrated). The circuit C1 on the primary side operates as a DC/DC converter according to the connection structure between the first and second switches S1 and S2, the inductor $L_P$ on the primary side and the capacitor $C_{PRI}$ described above, and the complementary on-off control of the first and second switches S1 and S2. As the circuit C1 on the primary side operates as the DC/DC converter, a first voltage is formed on the primary side of the transformer with an input voltage $V_{IN}$ from an input power source stepped down.

As illustrated in FIG. 2, the circuit C1 on the primary side is provided with two power source terminals $V_{COM}$ and $V_{PR}$ on the primary side. A first power source terminal $V_{COM}$ corresponds to a source terminal of the second switch S2, and a second power source terminal $V_{PRI}$ corresponds to a connection node between the inductor $L_P$ on the primary side and the capacitor $C_{PRI}$. In case that the first power source terminal $V_{COM}$ is grounded (i.e., connected to a (−) terminal of the input power source), a first voltage is formed at the second power source terminal $V_{PRI}$, in which case the circuit C1 on the primary side operates as a buck converter. In case that the second power source terminal $V_{PRI}$ is grounded (i.e., connected to a (−) terminal of the input power source), the first voltage is formed at the first power source terminal $V_{COM}$, in which case the circuit C1 on the primary side operates as a buck-boost converter. This is further described in first to fourth embodiments described below.

The circuit C2 on the secondary side includes first to N sub-circuits $SC_1$ to $SC_N$ (N is a natural number of 2 or more), and each of the sub-circuits $SC_1$ to $SC_N$ operates to generate a power source voltage of a driver (e.g., a gate driver) that drives a power element (e.g., an upper switch (MOSFET) and a lower switch (MOSFET) provided in an inverter). The number of sub-circuits (i.e., a value of N) is determined based on a power conversion system to which the power source apparatus of the present embodiment is applied. For example, when applied to generate a drive power source for the gate driver for driving the power element of the inverter INV illustrated in FIG. 1, the sub-circuits may be constituted of a total of four sub-circuits that are constituted of three sub-circuits for generating drive power sources ($V_{1P}$, $V_{1C}$, and $V_{1N}$) to ($V_{3P}$, $V_{3C}$, and $V_{3N}$) of the gate drivers $GD_1$, $GD_2$, and $GD_3$ that drive the upper switches $Q_{AH}$, $Q_{BH}$, and $Q_{CH}$; and one sub-circuit for generating the same drive power sources $V_{4P}$, $V_{4C}$, and $V_{4N}$ of the gate drivers $GD_4$, $GD_5$, and $GD_6$ that drive the lower switches $Q_{AL}$, $Q_{BL}$, and $Q_{CL}$, (FIGS. 3 to 6 illustrate examples of the circuit on the secondary side constituted of four sub-circuits).

The sub-circuits $SC_1$ to $SC_N$ include a rectification circuit constituted of a diode Dr and a capacitor $C_P$, and a converter CVT (non-isolated type of DC/DC converter). The converter CVT operates based on a second voltage that is formed on the secondary side of the transformer after a first voltage formed by the circuit C1 on the primary side is transformed by the transformer, and may output a preconfigured output voltage in a manner that controls a main switch MS that constitutes the converter CVT through an embedded controller itself. The converter CVT may be implemented as a buck converter or a buck-boost converter.

As illustrated in FIG. 2, the sub-circuits $SC_1$ to $SC_N$ have three final output nodes, including first and second nodes $ND_A$ and $ND_C$ that form a second voltage, and a converter output node $ND_B$ (In case that the converter CVT is implemented as a buck converter, the converter output node $ND_B$ corresponds to the connection node between a inductor L and a capacitor C constituting the converter CVT, and in case that the converter CVT is implemented as a buck-boost converter, the converter output node $ND_B$ corresponds to the connection node between a diode D and the capacitor C constituting the converter CVT) that forms an output voltage of the converter CVT (The output voltage of the converter CVT may also be expressed as a voltage of the capacitor C constituting the converter CVT, with the second node $ND_C$ as the reference potential node) in relation to the second node $ND_C$. Two nodes of the three final output nodes function as nodes where bipolar voltages (a positive voltage and a negative voltage) are formed as a power source voltage for the driver, and the other node functions as a common ground for the bipolar voltages (this will be described in detail in first to fourth embodiments). Meanwhile, in FIGS. 2 to 6, the reference numerals representing the nodes are the same as $ND_A$, $ND_B$, and $ND_C$ for each sub-circuit for convenience, but an actual voltage formed at each node may be constituted differently for each sub-circuit. Each bipolar voltage generated by each sub-circuit is constituted to be isolated from each other.

Which node each node $ND_A$, $ND_B$, and $ND_C$ will function as is determined by whether the circuit C1 on the primary side described above operates as a buck converter or a buck-boost converter, and by whether the converter CVT of the circuit C2 on the secondary side is implemented as a buck converter or a buck-boost converter. That is, the power source apparatus in FIG. 2 may be derived into four embodiments based on the four cases described above. In each embodiment, in common, the power source voltages generated by the sub-circuits $SC_1$ to $SC_N$, that is, the bipolar voltages, are determined dependently on the output voltage of the converter CVT. For example, in the circuit structure of the present embodiment according to FIG. 2, (i) when the converter output node $ND_B$ functions as a common ground, in the second node $ND_C$, a voltage is formed to form a potential difference as much as the output voltage of the preconfigured converter CVT with respect to the converter output node ($ND_B$, voltage=0 V) functioning as the common ground, and (ii) when the converter output node $ND_B$ functions as a node for forming a bipolar voltage (a positive voltage or a negative voltage), the output voltage of the converter CVT itself constitutes the bipolar voltage. Therefore, the output voltage of the converter CVT becomes a factor in determining the bipolar voltages generated by the sub-circuits $SC_1$ to $SC_N$. This means that the drive voltage of the driver (the gate driver) can be easily adjusted without changing a turns ratio of the transformer.

Hereinafter, first to fourth embodiments will be described in detail. In each embodiment, since the operations of the sub-circuits $SC_1$ to $SC_N$ are the same, the operations will be described based on an uppermost sub-circuit $SC_1$ on the circuit C2 on the secondary side.

Embodiment 1

In a first embodiment according to power topology of Table 1 below and FIG. 3, the circuit C1 on the primary side operates as a buck converter and the converter CVT of the circuit C2 on the secondary side is implemented as a buck converter.

TABLE 1

| Power source terminal on primary side (first voltage-forming terminal) | Second power source terminal $V_{PRI}$ (first power source terminal $V_{COM}$ is ground) |
|---|---|
| Circuit C1 on primary side | Operated as buck converter |
| Transformer turns ratio | 1:n |
| Method of implementing converter CVT of circuit C2 on secondary side | Buck converter |
| First node $ND_A$ | Forming positive voltage |
| Converter output node $ND_B$ | Common ground |
| Second node $ND_C$ | Forming negative voltage |

In the first embodiment, the first node $ND_A$ is defined as a current draw-out node (a node on the opposite side of the dot of the inductor on the secondary side) from the inductor on the secondary side $L_{S1}$ to $L_{SN}$, and the second node $ND_C$ is defined as a current draw-in node (a node on the dot side of the inductor on the secondary side) into the inductor on the secondary side $L_{S1}$ to $L_{SN}$.

As the circuit C1 on the primary side operates as a buck converter, the first voltage is formed at the second power source terminal $V_{PRI}$ with the input voltage $V_{IN}$ stepped down (a value of the first voltage is determined by a control duty ratio of the first and second switches S1 and S2).

Since the turns ratio of the transformer is 1:n, the second voltage (=n*first voltage) is formed between the first node $ND_A$ and the second node $ND_C$ of the circuit C2 on the secondary side.

When the converter CVT output voltage is configured as α [V] (α>0), α [V] is formed between the converter output node $ND_B$ and the second node $ND_C$, and since 0 [V] is formed at the converter output node $ND_B$ as a common ground, −α [V] is formed at the second node $ND_C$. In addition, since the second voltage is formed between the first node $ND_A$ and the second node $ND_C$, $-\alpha$+second voltage [V] is formed at the first node $ND_A$. The $-\alpha$+second voltage [V] formed at the first node $ND_A$ and the $-\alpha$ [V] formed at the second node $ND_C$ correspond to the power source voltage of the driver, that is, the positive and negative voltages of the bipolar voltage.

Figure 3:
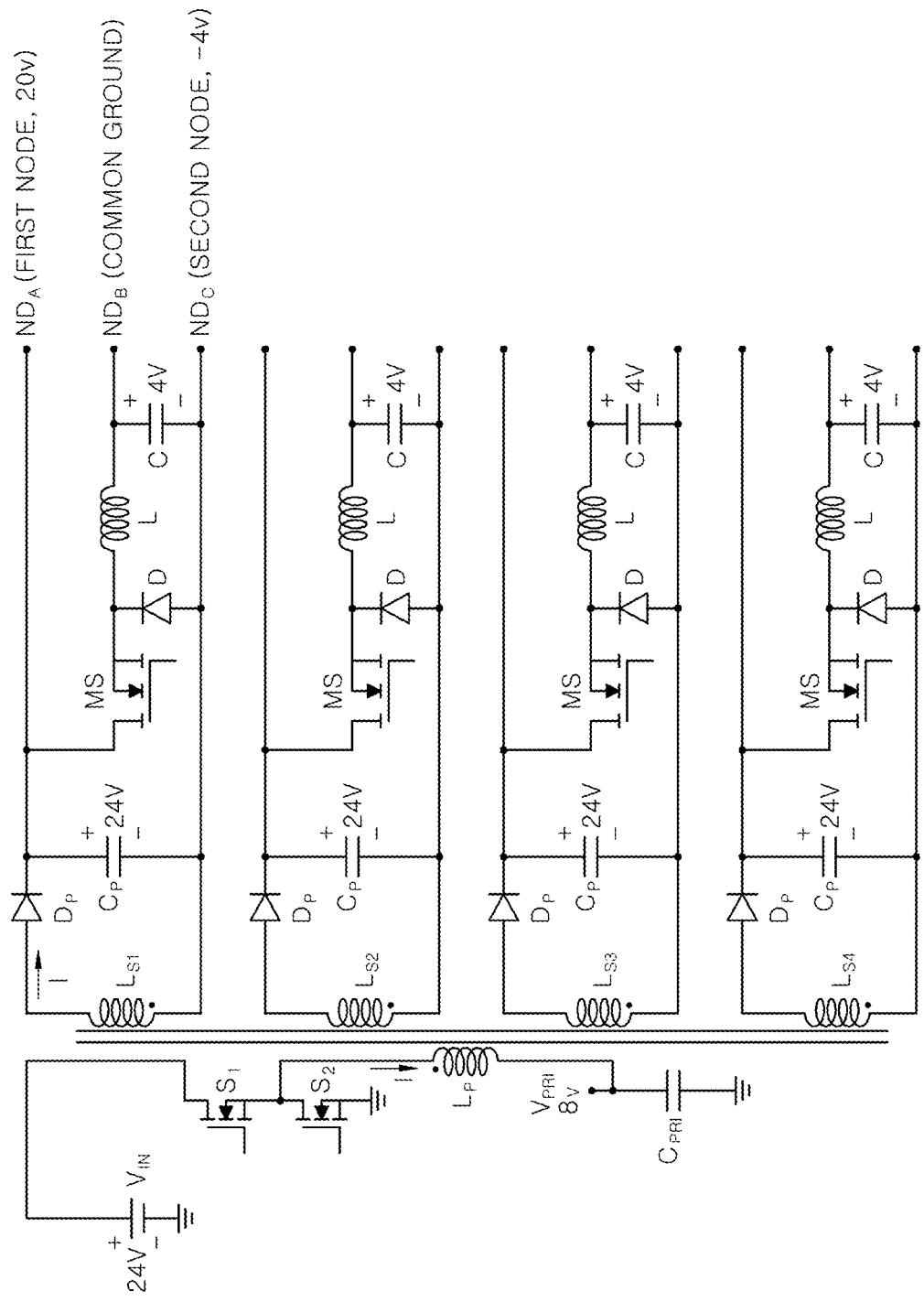
FIG. 3 is a circuit diagram of a power source apparatus according to a first embodiment of the present disclosure.

As a specific embodiment according to FIG. 3, it is assumed that the input voltage $V_{IN}$ is configured to be 24 [V], the first voltage to be 8 [V], the transformer winding ratio to be 1:3, and the converter output voltage to be 4 [V]. The magnitude of the second voltage is formed as 3*8=24 [V], and since the converter output node $ND_B$ is the common ground, −4 [V] is formed at the second node $ND_C$, and −4+24=20 [V] is formed at the first node $ND_A$. The 20 [V] formed at the first node $ND_A$ and the −4 [V] formed at the second node $ND_C$ correspond to the power source voltage of the driver, that is, the positive and negative voltages of the bipolar voltage.

Embodiment 2

In a second embodiment according to power topology of Table 2 below and FIG. 4, the circuit C1 on the primary side operates as a buck-boost converter and the converter CVT of the circuit C2 on the secondary side is implemented as a buck converter.

TABLE 2

| Power source terminal on primary side (first voltage-forming terminal) | Second power source terminal $V_{PRI}$ (first power source terminal $V_{COM}$ is ground) |
|---|---|
| Circuit C1 on primary side | Operated as buck converter |
| Transformer turns ratio | 1:n |
| Method of implementing converter CVT of circuit C2 on secondary side | Buck-boost converter |
| First node $ND_A$ | Forming positive voltage |
| Converter output node $ND_B$ | Forming negative voltage |
| Second node $ND_C$ | Common ground |

In the second embodiment, the first node $ND_A$ is defined as a current draw-out node (a node on the opposite side of the dot of the inductor on the secondary side) from the inductor on the secondary side $L_{S1}$ to $L_{SN}$, and the second node $ND_C$ is defined as a current draw-in node (a node on the dot side of the inductor on the secondary side) into the inductor on the secondary side $L_{S1}$ to $L_{SN}$.

As the circuit C1 on the primary side operates as a buck converter, the first voltage is formed at the second power source terminal $V_{PRI}$ with the input voltage $V_{IN}$ dropped (a value of the first voltage is determined by a control duty ratio of the first and second switches S1 and S2).

Since the turns ratio of the transformer is 1:n, the second voltage (=n*first voltage) is formed between the first node $ND_A$ and the second node $ND_C$ of the circuit C2 on the secondary side.

When the converter CVT output voltage is configured as α [V] (α<0), α [V] is formed between the converter output node $ND_B$ and the second node $ND_C$, and since 0 [V] is formed at the second node $ND_C$ as a common ground, α [V] is formed at the converter output node $ND_B$. In addition, since the second voltage is formed between the first node $ND_A$ and the second node $ND_C$, the second voltage [V] is formed at the first node $ND_A$. The second voltage [V] formed at the first node $ND_A$ and the α [V] that is the converter output voltage correspond to the power source voltage of the driver, that is, the positive and negative voltages of the bipolar voltage.

Figure 4:
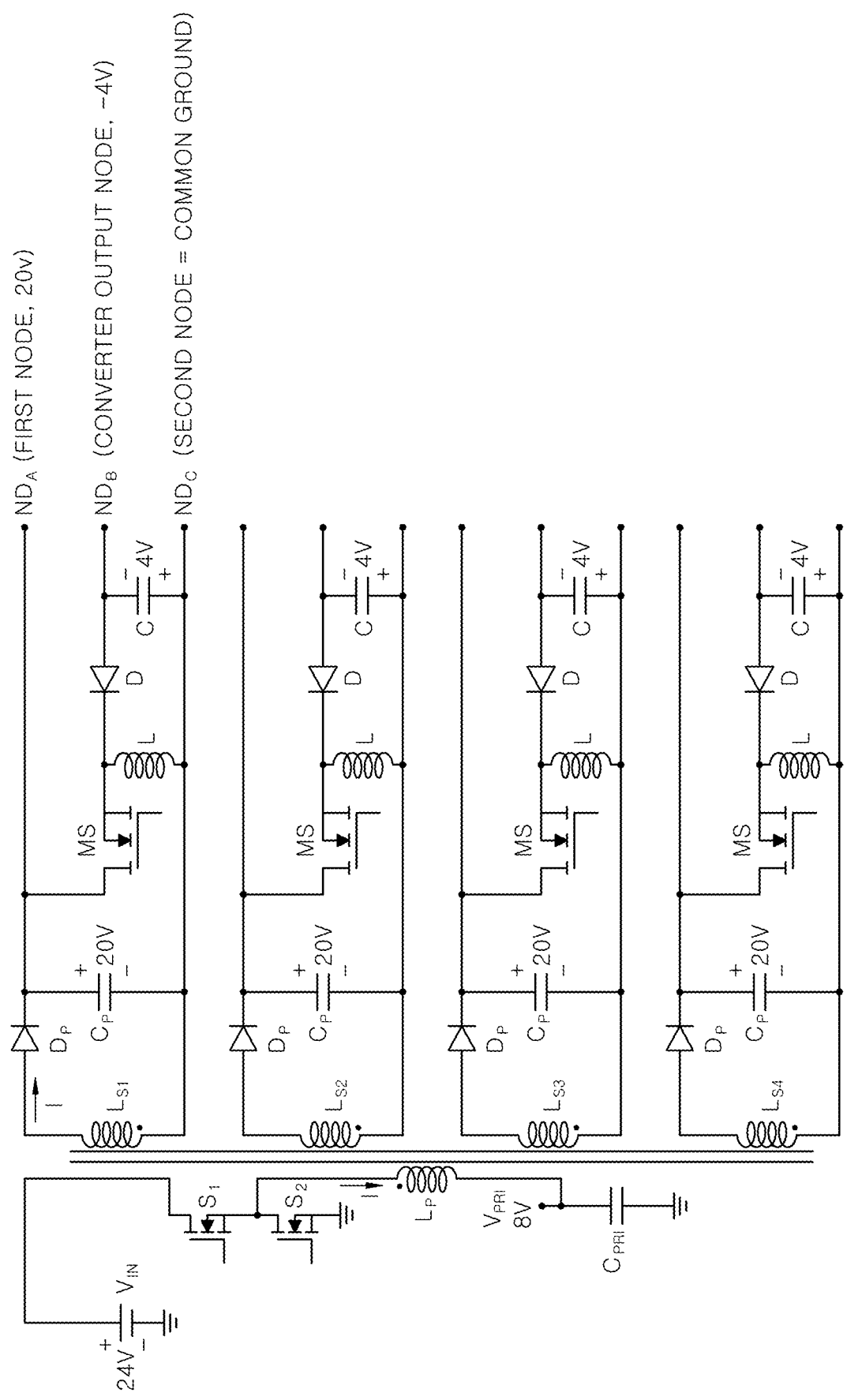
FIG. 4 is a circuit diagram of a power source apparatus according to a second embodiment of the present disclosure.

As a specific embodiment according to FIG. 4, it is assumed that the input voltage $V_{IN}$ is configured to be 24 [V], the first voltage to be 8 [V], the transformer winding ratio to be 1:2.5, and the converter output voltage to be −4 [V]. The magnitude of the second voltage is formed as 2.5*8=20 [V], and since the second node $ND_C$ is the common ground, −4 [V] is formed at the converter output node $ND_B$, and 20 [V] is formed at the first node $ND_A$. The 20 [V] formed at the first node $ND_A$ and the −4 [V] that is the converter output voltage correspond to the power source voltage of the driver, that is, the positive and negative voltages of the bipolar voltage.

Embodiment 3

In a third embodiment according to power topology of Table 3 below and FIG. 5, the circuit C1 on the primary side operates as a buck-boost converter and the converter CVT of the circuit C2 on the secondary side is implemented as a buck converter.

TABLE 3

| Power source terminal on primary side (first voltage-forming terminal) | First power source terminal $V_{COM}$ (second power source terminal $V_{PRI}$ is ground) |
|---|---|
| Circuit C1 on primary side | Operated as buck-boost converter |
| Transformer turns ratio | 1:n |
| Method of implementing converter CVT of circuit C2 on secondary side | Buck converter |
| First node $ND_A$ | Forming positive voltage |
| Converter output node $ND_B$ | Common ground |
| Second node $ND_C$ | Forming negative voltage |

In the third embodiment, the first node $ND_A$ is defined as a current draw-in node (a node on the dot side of the inductor on the secondary side) into the inductor on the secondary side $L_{S1}$ to $L_{SN}$, and the second node $ND_C$ is defined as a current draw-out node (a node on the opposite side of the dot of the inductor on the secondary side) from the inductor on the secondary side $L_{S1}$ to $L_{SN}$.

As the circuit C1 on the primary side operates as a buck-boost converter, the first voltage is formed at the first power source terminal $V_{COM}$ with the input voltage $V_{IN}$ stepped down (a value of the first voltage is determined by a control duty ratio of the first and second switches S1 and S2).

Since the turns ratio of the transformer is 1:n, the second voltage (=n*first voltage) is formed between the first node $ND_A$ and the second node $ND_C$ of the circuit C2 on the secondary side.

When the converter CVT output voltage is configured as α [V] (α>0), α [V] is formed between the converter output node $ND_B$ and the second node $ND_C$, and since 0 [V] is formed at the converter output node $ND_B$ as a common ground, −α [V] is formed at the second node $ND_C$. In addition, since the second voltage is formed between the first node $ND_A$ and the second node $ND_C$, −α+second voltage [V] is formed at the first node $ND_A$. The −α+second voltage [V] formed at the first node $ND_A$ and the −α [V] formed at the second node $ND_C$ correspond to the power source voltage of the driver, that is, the positive and negative voltages of the bipolar voltage.

Figure 5:
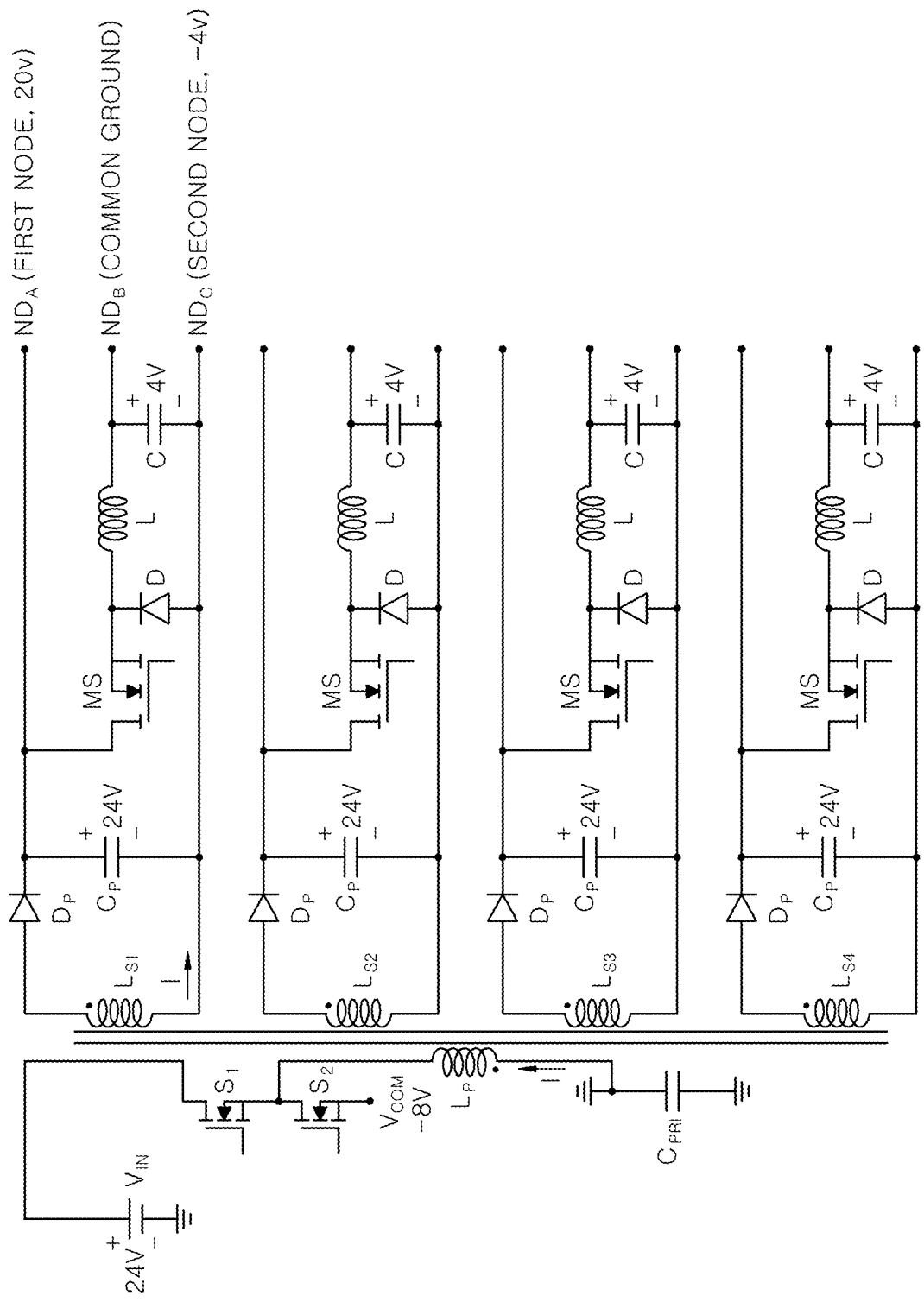
FIG. 5 is a circuit diagram of a power source apparatus according to a third embodiment of the present disclosure.

As a specific embodiment according to FIG. 5, it is assumed that the input voltage $V_{IN}$ is configured to be 24 [V], the first voltage to be −8 [V], the transformer winding ratio to be 1:3, and the converter output voltage to be 4 [V]. The magnitude of the second voltage is formed as 3*8=24 [V], and since the converter output node $ND_B$ is the common ground, −4 [V] is formed at the second node $ND_C$, and −4+24=20 [V] is formed at the first node $ND_A$. The 20 [V] formed at the first node $ND_A$ and the −4 [V] formed at the second node $ND_C$ correspond to the power source voltage of the driver, that is, the positive and negative voltages of the bipolar voltage.

Embodiment 4

Figure 6:
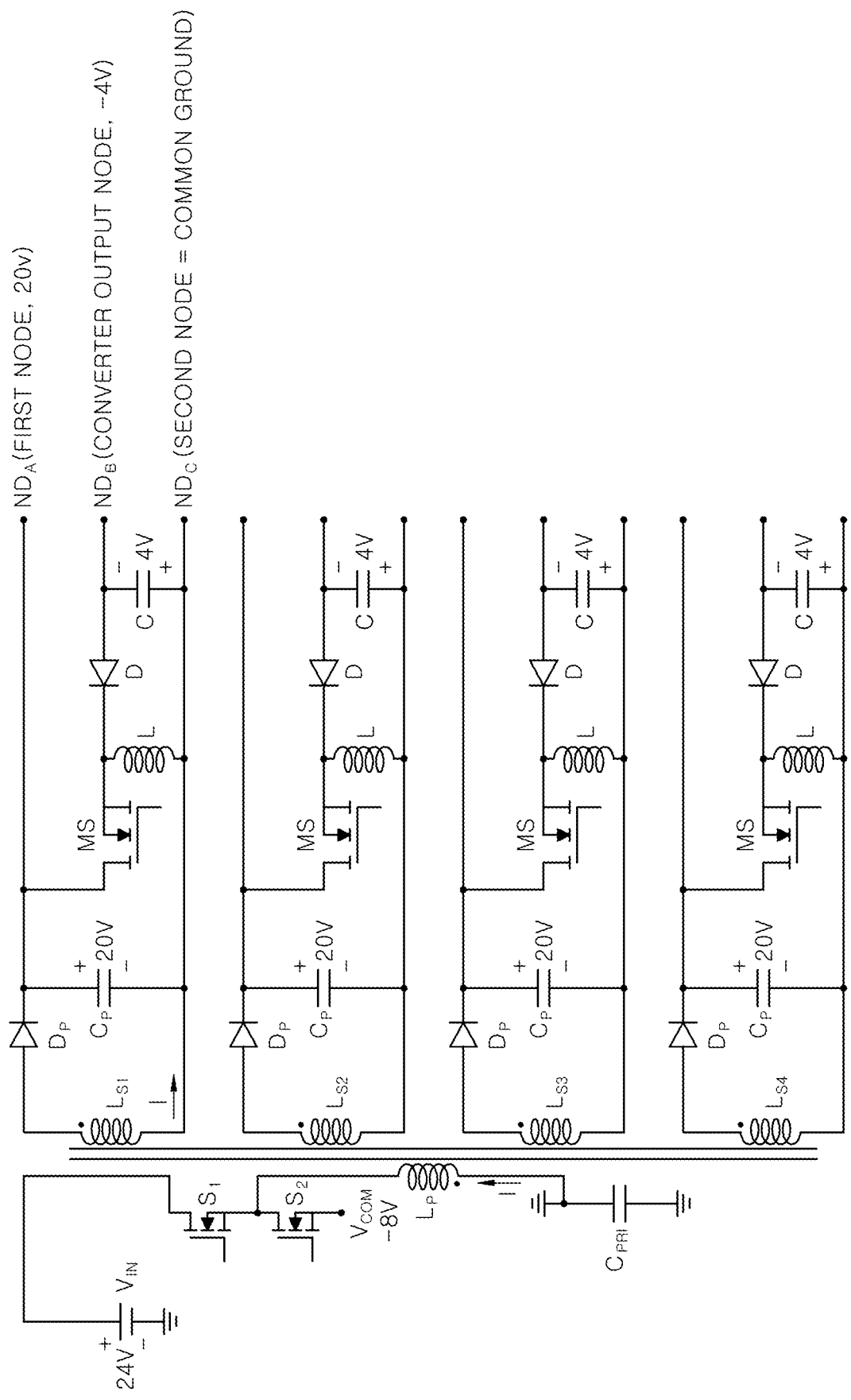
FIG. 6 is a circuit diagram of a power source apparatus according to a fourth embodiment of the present disclosure.

In a fourth embodiment according to power topology of Table 4 below and FIG. 6, the circuit C1 on the primary side operates as a buck-boost converter and the converter CVT of the circuit C2 on the secondary side is implemented as a buck-boost converter.

TABLE 4

| Power source terminal on primary side (firstFirst power voltage-forming terminal) | power source terminal $V_{COM}$ (second power source terminal $V_{PRI}$ is ground) |
|---|---|
| Circuit C1 on primary side | Operated as buck-boost converter |
| Transformer turns ratio | 1:n |
| Method of implementing converter CVT of circuit C2 on secondary side | Buck-boost converter |
| First node $ND_A$ | Forming positive voltage |
| Converter output node $ND_B$ | Forming negative voltage |
| Second node $ND_C$ | Common ground |

In the fourth embodiment, the first node $ND_A$ is defined as a current draw-in node (a node on the dot side of the inductor on the secondary side) into the inductor on the secondary side $L_{S1}$ to $L_{SN}$, and the second node $ND_C$ is defined as a current draw-out node (a node on the opposite side of the dot of the inductor on the secondary side) from the inductor on the secondary side $L_{S1}$ to $L_{SN}$.

As the circuit C1 on the primary side operates as a buck-boost converter, the first voltage is formed at the first power source terminal $V_{COM}$ with the input voltage $V_{IN}$ dropped (a value of the first voltage is determined by a control duty ratio of the first and second switches S1 and S2).

Since the turns ratio of the transformer is 1:n, the second voltage (=n*first voltage) is formed between the first node $ND_A$ and the second node $ND_C$ of the circuit C2 on the secondary side.

When the converter CVT output voltage is configured as α [V] (α<0), α [V] is formed between the converter output node $ND_B$ and the second node $ND_C$, and since 0 [V] is formed at the second node $ND_C$ as a common ground, α [V] is formed at the converter output node $ND_B$. In addition, since the second voltage is formed between the first node $ND_A$ and the second node $ND_C$, the second voltage [V] is formed at the first node $ND_A$. The second voltage [V] formed at the first node $ND_A$ and the α [V] that is the converter output voltage correspond to the power source voltage of the driver, that is, the positive and negative voltages of the bipolar voltage.

As a specific embodiment, it is assumed that the input voltage $V_{IN}$ is configured to be 24 [V], the first voltage to be −8 [V], the transformer winding ratio to be 1:2.5, and the converter output voltage to be −4 [V]. The magnitude of the second voltage is formed as 2.5*8=20 [V], and since the second node $ND_C$ is the common ground, −4 [V] is formed at the converter output node $ND_B$, and 20 [V] is formed at the first node $ND_A$. The 20 [V] formed at the first node $ND_A$ and the −4 [V] that is the converter output voltage correspond to the power source voltage of the driver, that is, the positive and negative voltages of the bipolar voltage.

As an additional embodiment, the first voltage formed in the circuit C1 on the primary side may be used to generate a power source that is required at a portion of the primary side of the transformer. For example, as illustrated in FIG. 2, an embodiment may be provided that the first voltage of the second power source terminal $V_{PRI}$ is input to the buck converter to generate the $V_{CC}$ voltage (e.g., 3.3 V and 2.5 V) for signal processing on the primary side of the transformer, based on a circuit structure in which the second power source terminal $V_{PRI}$ is connected to a buck converter.

As described above, the present embodiment employs a circuit structure that generates the power source voltage (drive power source for floating ground) of the driver (gate driver) that drives the power element through the converter that operates based on the voltage of the secondary side formed on the secondary side of the transformer, thereby enabling the power source voltage of the driver to be supplied with efficiency, a light weight, simplicity, and a low cost. In addition, by employing the power topology in which the power source voltage of the driver is determined dependently on the output voltage of the converter, it is possible to easily adjust the power source voltage of the driver, especially the negative voltage, through a manner in which only the output voltage of the converter of the circuit on the secondary side is adjusted without changing the turns ratio of the transformer.

For example, the configurations described in the present specification may be implemented as methods or processes, devices, software programs, data stream, or signals. Even though only the implementation of the single form is described (e.g., only the method is described), the described features may also be implemented in other forms (e.g., devices or programs). The device may be implemented as appropriate hardware, software, firmware, and the like. For example, the method may be implemented by devices such as processors generally referring to processing devices including computers, microprocessors, integrated circuits, programmable logic devices, or the like. The processors also include communication devices such as computers, cellular phones, portable/personal information terminals (personal digital assistants (PDA)), and other devices that facilitate information communication with final users.

While the present disclosure has been described with reference to the embodiment illustrated in the drawings, the embodiment is described just for illustration, and those skilled in the art to the present technology pertains will understand that various modifications of the embodiment and any other embodiment equivalent thereto are available. Accordingly, the true technical protection scope of the present disclosure should be determined by the appended claims.

What is claimed is:

1. A power source apparatus comprising:
   a circuit on a primary side constituted so that a first voltage with an input voltage stepped down is formed on the primary side of a transformer; and
   a circuit on a secondary side including first to N sub-circuits (N is a natural number of 2 or more), each sub-circuit operating to generate a power source voltage of a driver configured to drive a power element through a converter operating based on a second voltage formed on the secondary side of the transformer after the first voltage is transformed by the transformer,
   wherein the power source voltage is constituted as a bipolar voltage having a positive voltage and a negative voltage,
   wherein the sub-circuit includes a first node, a second node, and a converter output node,
   wherein the second voltage corresponds to a potential difference between the first node and the second node,
   wherein a potential difference between the converter output node and the second node corresponds to an output voltage of the converter,
   wherein two nodes of the first node, the second node, and the converter output node function as nodes at which the bipolar voltage is formed, and the other node functions as a common ground for the bipolar voltage, and
   wherein the bipolar voltage, which is the power source voltage generated by the sub-circuit is determined dependently on an output voltage of the converter.

2. The power source apparatus of claim 1, wherein the circuit on the primary side includes first and second switches, and
   wherein the input voltage is stepped down to form the first voltage based on a complementary operation of the first and second switches.

3. The power source apparatus of claim 2, wherein the first and second switches and an inductor on the primary side of the transformer constitute the converter configured to step down the input voltage to form the first voltage.

4. The power source apparatus of claim 1, wherein each bipolar voltage generated by each of the sub-circuits is constituted to be insulated from each other.

5. The power source apparatus of claim 1, wherein functions of the first node, the second node, and the converter output node are determined by a voltage converting operation of the circuit on the primary side and the circuit on the secondary side.

6. The power source apparatus of claim 5, wherein in case that the circuit on the primary side operates as a buck converter and the converter of the circuit on the secondary side is implemented as a buck converter, the first node and the second node each function as a node at which the positive voltage and the negative voltage of the bipolar voltage are formed, and the converter output node functions as a common ground.

7. The power source apparatus of claim 5, wherein in case that the circuit on the primary side operates as a buck converter and the converter of the circuit on the secondary side is implemented as a buck-boost converter, the first node and the converter output node each function as a node at which the positive voltage and the negative voltage of the bipolar voltage are formed, and the second node functions as a common ground.

8. The power source apparatus of claim 5, wherein in case that the circuit on the primary side operates as a buck-boost converter and the converter of the circuit on the secondary side is implemented as a buck converter, the first node and the second node each function as a node at which the positive voltage and the negative voltage of the bipolar voltage are formed, and the converter output node functions as the common ground.

9. The power source apparatus of claim 5, wherein in case that the circuit on the primary side operates as a buck-boost converter and the converter of the circuit on the secondary side is implemented as a buck-boost converter, the first node and the converter output node each function as a node at which the positive voltage and the negative voltage of the bipolar voltage are formed, and the second node functions as the common ground.

* * * * *